US012754816B2

(12) United States Patent

Vinayak et al.

(10) Patent No.: US 12,754,816 B2

(45) Date of Patent: Oct. 6, 2026

(54) GENERATIVE ARTIFICIAL INTELLIGENCE-BASED INTERFACE TO BASEBOARD MANAGEMENT CONTROLLERS

(71) Applicant: Hewlett Packard Enterprise Development LP, Spring, TX (US)

(72) Inventors: Nandagopal Netrakanti Vinayak, Bangalore (IN); Gautam Satish, Bangalore (IN); Kaushik Ramachandran, Bangalore (IN); Lingam Perumal, Bangalore (IN); Koichiro Nakajima, Fort Collins, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 22 days.

(21) Appl. No.: 19/193,750

(22) Filed: Apr. 29, 2025

(65) Prior Publication Data

US 2026/0252457 A1 Aug. 27, 2026

(30) Foreign Application Priority Data

Feb. 25, 2025 (IN) ............................ 202541016534

(51) Int. Cl.

| | |
|---|---|
| ***G06F 11/30*** | (2006.01) |
| ***G06F 11/32*** | (2006.01) |
| ***G06F 16/3329*** | (2025.01) |

(52) U.S. Cl.

CPC ........ *G06F 11/3086* (2013.01); *G06F 11/328* (2013.01); *G06F 16/33295* (2025.01)

(58) Field of Classification Search

None

See application file for complete search history.

(56) References Cited

U.S. PATENT DOCUMENTS

2025/0181623 A1* 6/2025 Jain ......................... G06F 16/31

2025/0342179 A1* 11/2025 Gangumalla ........... G06F 16/31

OTHER PUBLICATIONS

AWS, "What are Large Language Models (LLM)?", available online at <https://web.archive.org/web/20240402060448/ https://aws.amazon.com/what-is/large-language-model/>, Apr. 2, 2024, 8 pages.

(Continued)

*Primary Examiner* — Cai Y Chen

(74) *Attorney, Agent, or Firm* — Hewlett Packard Enterprise Patent Department

(57) ABSTRACT

In certain examples, a method includes obtaining, by a baseboard management controller (BMC) management platform, static information data sets from static information sources, and a dynamic information data set from a dynamic information source; processing, by a common format document generator of the BMC management platform, the static information data sets and the dynamic information data set to obtain common format documents; processing, by an embedding large language model (LLM), the common format documents to obtain vectors representing data included in the common format documents; receiving, at an inference LLM, a natural language query from a user interface of a BMC of a computing device; and generating, by the inference LLM, a natural language response to the natural language query based at least in part on the natural language query and a portion of the plurality of vectors.

18 Claims, 5 Drawing Sheets

(56) References Cited

OTHER PUBLICATIONS

AWS, "What is RAG (Retrieval-Augmented Generation)?", available online at <https://web.archive.org/web/20240402175741/https://aws.amazon.com/what-is/retrieval-augmented-generation/>, Apr. 2, 2024, 8 pages.
DMTF, "Redfish®", available online at <https://web.archive.org/web/20240812004948/https://www.dmtf.org/standards/redfish>, Aug. 12, 2024, 5 pages.
Langchain, "The largest community building the future of LLM apps", available online at <https://web.archive.org/web/20240718085848/https://www.langchain.com/langchain>, Jul. 18, 2024, 13 pages.

* cited by examiner

GENERATIVE ARTIFICIAL INTELLIGENCE-BASED INTERFACE TO BASEBOARD MANAGEMENT CONTROLLERS

BACKGROUND

A computing device may be managed, at least in part, via a user accessing a baseboard management controller (BMC) of the computing device. To facilitate such access, BMCs often include a user interface (UI) such as, for example, graphical UIs (GUIs), web-based UIs, application programming interfaces (APIs), command line interfaces (CLIs), and the like. However, such UIs often assume that a user has comprehensive knowledge of the various technologies, functionalities, protocols, specifications, documentation, and the like associated with the UI, the BMC, and/or the computing device.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims. Aspects of the present disclosure are best understood from the following detailed description when read with the accompanying figures. For a more complete understanding of this disclosure, and advantages thereof, reference is now made to the following descriptions taken in conjunction with the accompanying drawings, in which:

DESCRIPTION

Figure 1:
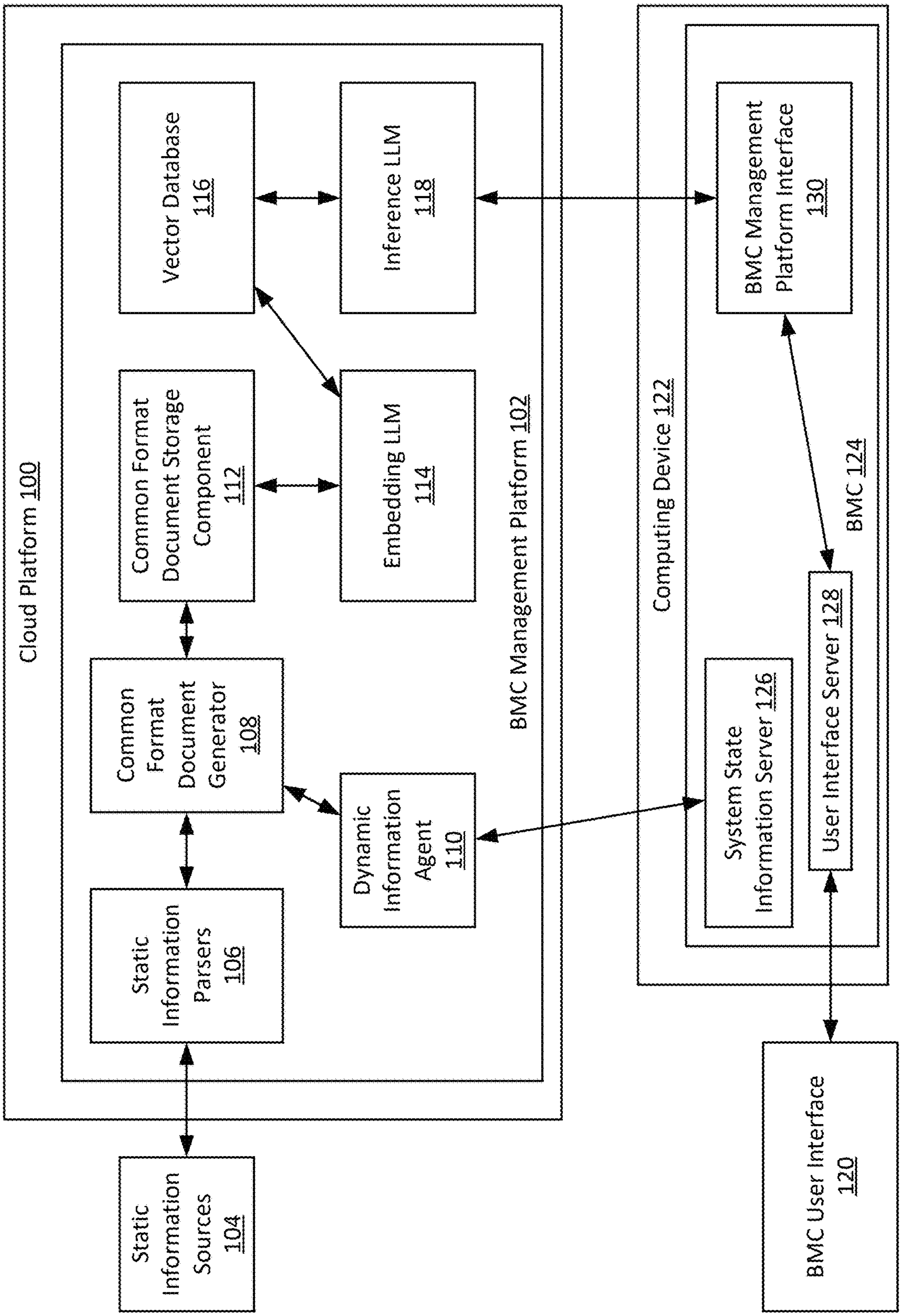
FIG. 1 shows a block diagram of a system for a generative artificial intelligence-based interface to BMCs, in accordance with one or more examples disclosed herein.

The following disclosure provides many different examples for implementing different features. Specific examples of components and arrangements are described below to simplify the present disclosure. These are, of course, merely examples and are not intended to be limiting.

Computing devices (e.g., servers) often include embedded management technologies, such as baseboard management controllers (BMCs) (e.g., Integrated Lights Out (iLO) from Hewlett Packard Enterprise). BMCs are often complex technologies that allow users to interact with computing devices remotely (e.g., to configure, monitor, obtain information about, and the like). As an example, a user may interact with a BMC of a computing device to perform firmware management, perform system administration, perform security management, monitor usage, perform troubleshooting, and the like. BMCs may also implement various specifications, such as Platform Level Data Model (PLDM), Security Protocol and Data Models (SPDM). Additionally, BMCs often include various types of user interfaces, such as, for example, graphical user interfaces (GUIs), web-based UIs, application programming interfaces (APIs), command line interfaces (CLIs), and the like. The various functionalities, user interfaces, specifications, and the like implemented on a BMC, and the computing devices that include BMCs, are often each associated with corresponding complex product documentation intended to provide information to users of a BMC.

However, to effectively use a BMC for managing a computing device often requires a user to have comprehensive expertise in a variety of areas, and be familiar with a disparate set of documentation, user manuals, guides, and the like. Many users lack such expertise, and, consequently, often have a sub-optimal user experience when attempting to manage computing devices using BMCs. Moreover, while documentation and user guides may provide information for using a BMC, such resources lack up-to-date information about the current state of the computing device.

Examples disclosed herein address, at least in part, the above-described and other challenges with using a BMC to manage a computing device by providing a new natural language interface for BMCs that allows users to make natural language queries (e.g., "What network protocols are enabled on this BMC?"; "How do I update firmware using remote files?") to the natural language interface, and receive natural language responses. Thus, by using examples disclosed herein, users do not need to look through various UI user manual pages, remember obscure API semantics, or lookup information in product documentation. Instead, the natural language interface brings together and contextualizes such information for users, thereby providing an improved user experience. In one or more examples, responses to natural language queries from users are based on both static sources of information (e.g., user guides, documentation, schemas, and the like) and dynamic information sources (e.g., the current system state for a computing device). In one or more examples, the use of both static information sources and dynamic information sources to generate responses to natural language queries may be considered a form of enhanced retrieval-augmented generation (RAG).

In one or more examples, information is obtained from any number of static information sources. Examples of static information sources may include, but are not limited to, user guides (e.g., a user guide for the BMC), user interface documentation (e.g., API documentation), schemas that define how to interpret other information (e.g., Redfish schema), product documentation (e.g., documentation corresponding to the model of computing device in which a BMC is installed), and the like. Such static information may include, but is not limited to, recommendation values, threshold values, configuration and/or use instructions, contextual instructions, information for interpreting other data, and the like. Information from static information sources may not change frequently. Therefore, information from static information sources may be obtained once, and then re-obtained relatively infrequently, based, for example, on certain pre-defined triggers (e.g., a BMC firmware update, documentation version updates, and the like). Information from static information sources may be obtained, for example, from stored documents (e.g., .pdf user guides), websites (e.g., online API documentation, online product guides, and the like), and/or any other relevant source of static information (e.g., JavaScript Object Notation (JSON) schema for Redfish from the Distributed Management Task Force (DMTF)).

In one or more examples, information is also obtained from any number of dynamic information sources. A dynamic information source may be an information source for which information changes more frequently than static information sources. As an example, a dynamic information source may include state information for a computing device that includes a BMC, which changes continuously. Examples of such state information may include, but are not limited to, installed components, status of computing device, status of components of a computing device, temperature of various components, information from any number of logs monitoring the computing device, configuration information, protocol information, and the like. In such an example, a BMC may include a system state information server (e.g., a Redfish server) that is configured to obtain system state information from time to time. The system state information may be obtained periodically (e.g., every minute, every ten minutes, and the like), and/or may be obtained based on certain triggers (e.g., a change to a flag tracking whether any change has occurred for any state information for a computing device since some previous time). Such system state information may be obtained, for example, by an agent configured to obtain the dynamic system state information from the system state information server at the configured times.

In some examples, information from the static information sources may be obtained by one or more parsers, loaders, and the like. As an example, a pdf loader may obtain information from a .pdf BMC user guide, a web scraper may obtain information from documentation on a website for an API, and a JSON loader may obtain information from a JSON schema. As discussed above, information from dynamic information sources may be obtained by one or more agents configured to interact with corresponding servers that provide dynamic information (e.g., system state information) at recurring time intervals, based on various triggers, and the like. In some examples, the various components that obtain information from static information sources and dynamic information sources may execute remote from a BMC of a computing device. As an example, the various parsers, loaders, scrapers, agents, and the like may execute as components of a BMC management platform (which may be a portion of a larger cloud platform), and access the various static information sources and dynamic information sources (e.g., system state information servers executing on a BMC) over a network. In other examples, the various components that obtain information from static information sources and dynamic information sources may execute locally on a BMC, in scenarios where the BMC includes enough resources (e.g., compute resources, memory resources, storage resources, and the like) to execute the components.

In one or more examples, the information obtained from each of the static information sources and each of the dynamic information sources may be converted into a common format document by a common format document generator. As an example, the LangChain framework may be used as a common format document generator to generate separate LangChain documents for each of the static and dynamic information sources. In some examples, the common format document generator executes remote from a BMC. As an example, the common format document generator may execute as a component of the same BMC management platform that includes the various components that obtain information from the static and dynamic information sources. In other examples, the common format document generator may execute locally on a BMC of a computing device, in scenarios where the BMC includes enough resources (e.g., compute resources, memory resources, storage resources, and the like) to execute the common format document generator.

In one or more examples, the common format documents are processed by an embedding large language model (LLM) (e.g., OpenAI embedding LLM, a proprietary embedding LLM, and the like). In one or more examples, such processing includes converting the information in the common format documents into high dimensional vectors, which may encode the semantic contexts and relationships of the data included within the common format documents. In one or more examples, these vectors are stored in a vector database, and form a corpus of data that may be used, for example, by an inference LLM to provide natural language responses to natural language queries. In some examples, the embedding LLM executes remote from a BMC. As an example, the embedding LLM may execute as a component of the same BMC management platform that includes the various components that obtain information from the static and dynamic information sources and/or the common format document generator. In other examples, the embedding LLM may execute locally on a BMC of a computing device, in scenarios where the BMC includes enough resources (e.g., compute resources, memory resources, storage resources, and the like) to execute the embedding LLM.

In one or more examples, the vector database generated by the embedding LLM based on the common format documents generated by the common format document generator based on the static and dynamic information sources may be used by an inference LLM (e.g., generative pre-trained transformers (GPTs) such as GPT 3.5 turbo, GPT 4, other LLMs such as Gemini, Claude, proprietary inference LLMs, and the like). In one or more examples, the inference LLM is configured to receive natural language queries from a user interface of a BMC, and to provide natural language responses to the same. Such a response may be based on the query, context derived from the query, and the information included in the vector database representing the information from both the static and dynamic information sources. In some examples, the inference LLM executes remote from a BMC. As an example, the inference LLM may execute as a component of the same BMC management platform that includes the various components that obtain information from the static and dynamic information sources, the common format document generator, and/or the embedding LLM. In other examples, the inference LLM may execute locally on a BMC of a computing device, in scenarios where the BMC includes enough resources (e.g., compute resources, memory resources, storage resources, and the like) to execute the inference LLM.

In one or more examples, a user may access a user interface of a BMC of a computing device in order to query the BMC. Such queries may be intended to elicit information on any topic relevant to management, configuration, administration, diagnostics, troubleshooting, current state, and the like of a computing device. The user interface may, for example, be a natural language query interface configured as a chat interface. The user interface may be accessed via any technique for accessing a user interface of a BMC, such as, for example, access over a network (e.g., a web-based interface accessed over the Internet), access via a local port on the computing device, access via a command line interface (CLI), access to a graphical user interface, and the like.

In one or more examples, the user interface provides one or more fields into which a user may enter a natural language query. Such a query may be entered using any technique capable of conveying a natural language query to a user interface, including, but not limited to, typing a natural language query, selecting a user interface element (e.g., a button) to allow for input of a natural language query by speaking, and the like.

In one or more examples, a user enters a natural language query via the user interface of the BMC. In one or more examples, the natural language query is conveyed to the inference LLM. For example, when the inference LLM executes remote from the BMC, the natural language query may be received from a user at the user interface, communicated to a web server executing on the BMC, provided to an API client executing on the BMC, transmitted to an API server executing on a BMC management platform where the inference LLM also executes, and then provided to the inference LLM. In a scenario where the inference LLM executes on the BMC, the natural language query may take a path from the user interface to the inference LLM that is wholly within the BMC.

In either case, the inference LLM receives the natural language query, processes the natural language query to obtain information therefrom (e.g., the inference LLM may tokenize the content of the query), and use such information in conjunction with the vector representations in the vector database of the information from the static and dynamic information sources to generate a natural language response to the query. In one or more examples, the LLM temperature (e.g., a configurable parameter that controls the randomness of generated responses) may be set to zero so that the responses are more likely to stay faithful to the relevant context of the query. In one or more examples, the inference LLM may be configured to retain context derived from a query within a query session, thereby allowing the inference LLM to form better responses to subsequent related queries.

Examples disclosed herein may provide an improved user experience for users interacting with a BMC to manage, configure, monitor, troubleshoot, or otherwise interact with a BMC of a computing device by providing a natural language query user interface into which users may input natural language queries, and receive natural language responses. Such responses may be provided by an inference LLM that uses data from both static information sources and dynamic information sources (e.g., current system state of a computing device) to generate the responses. In one or more examples, the combination of certain types of static information (e.g., user guides, documentation, and the like), static information about how to interpret dynamic information (e.g., Redfish JSON schemas), and dynamic information (e.g., current system state) for use by an inference LLM to generate responses to natural language queries may result in an improved user experience for users seeking to interact with a BMC.

FIG. 1 shows a block diagram of a system for a generative artificial intelligence-based interface to BMCs in accordance with one or more examples disclosed herein. As shown in FIG. 1, the system includes a cloud platform 100. The cloud platform 100 may include a BMC management platform 102. The BMC management platform 102 may include any number of static information parsers 106, a common format document generator 108, a dynamic information agent 110, a common format document storage component 112, an embedding LLM 114, a vector database 116, and an inference LLM 118. The system may also include a computing device 122. The computing device 122 may include a BMC 124. The BMC 124 may include a system state information server 126, a BMC management platform interface 130, and a user interface server 128. The system may also include a BMC user interface 120, and static information sources 104. Each of these components is described below.

In one or more examples, a system, such as the system shown in FIG. 1, may include the cloud platform 100. In one or more examples, the cloud platform 100 is configured to provide management services for devices (e.g., computing devices, storage devices, network devices, infrastructure components, and the like) deployed at various locations. The cloud platform 100 may be provided, for example, by a service provider, from which entities (e.g., customers, companies, and the like) may also obtain various components and devices used to build a computing ecosystem.

Figure 4:
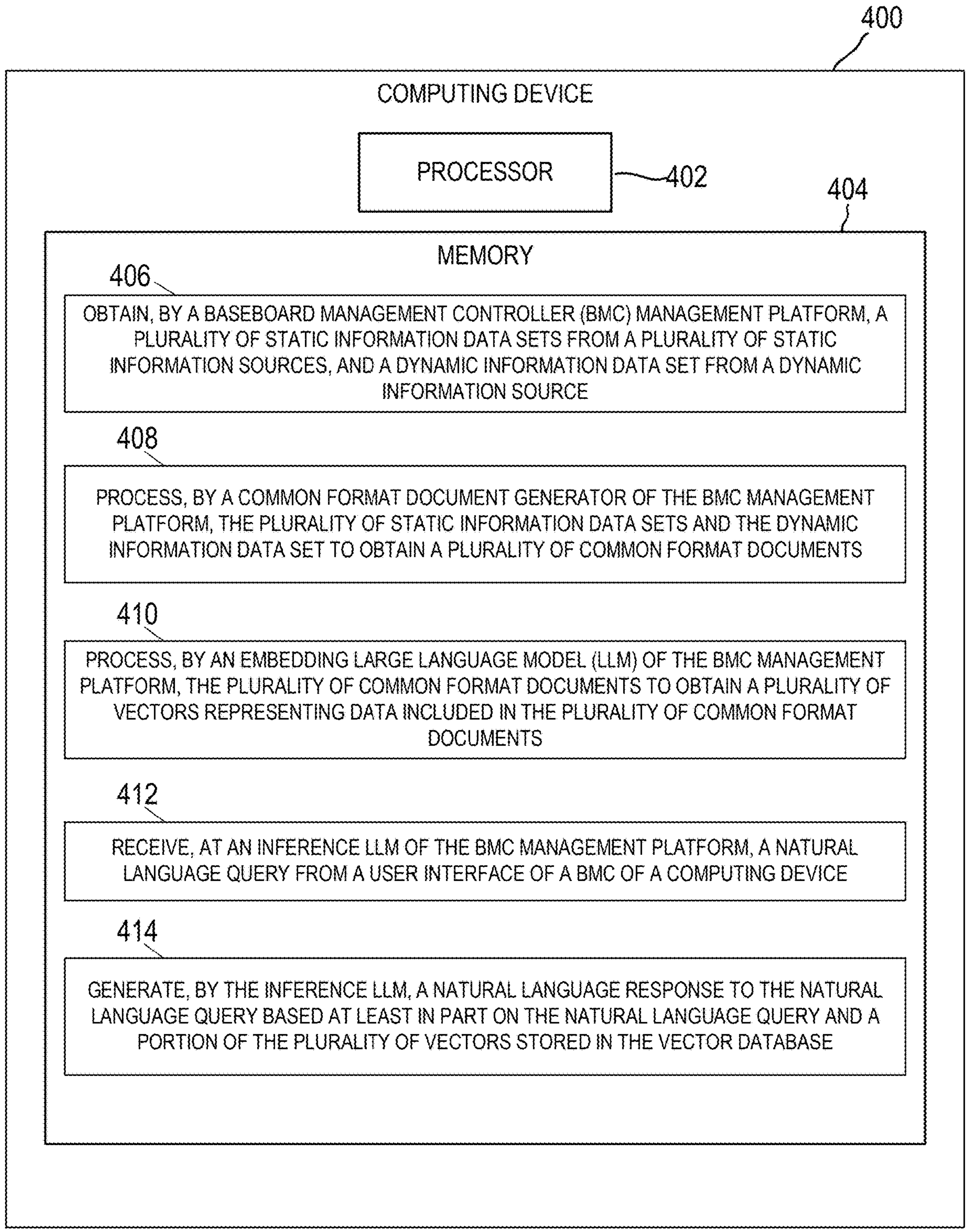
FIG. 4 illustrates a block diagram of a computing device, in accordance with one or more examples disclosed herein.
Figure 5:
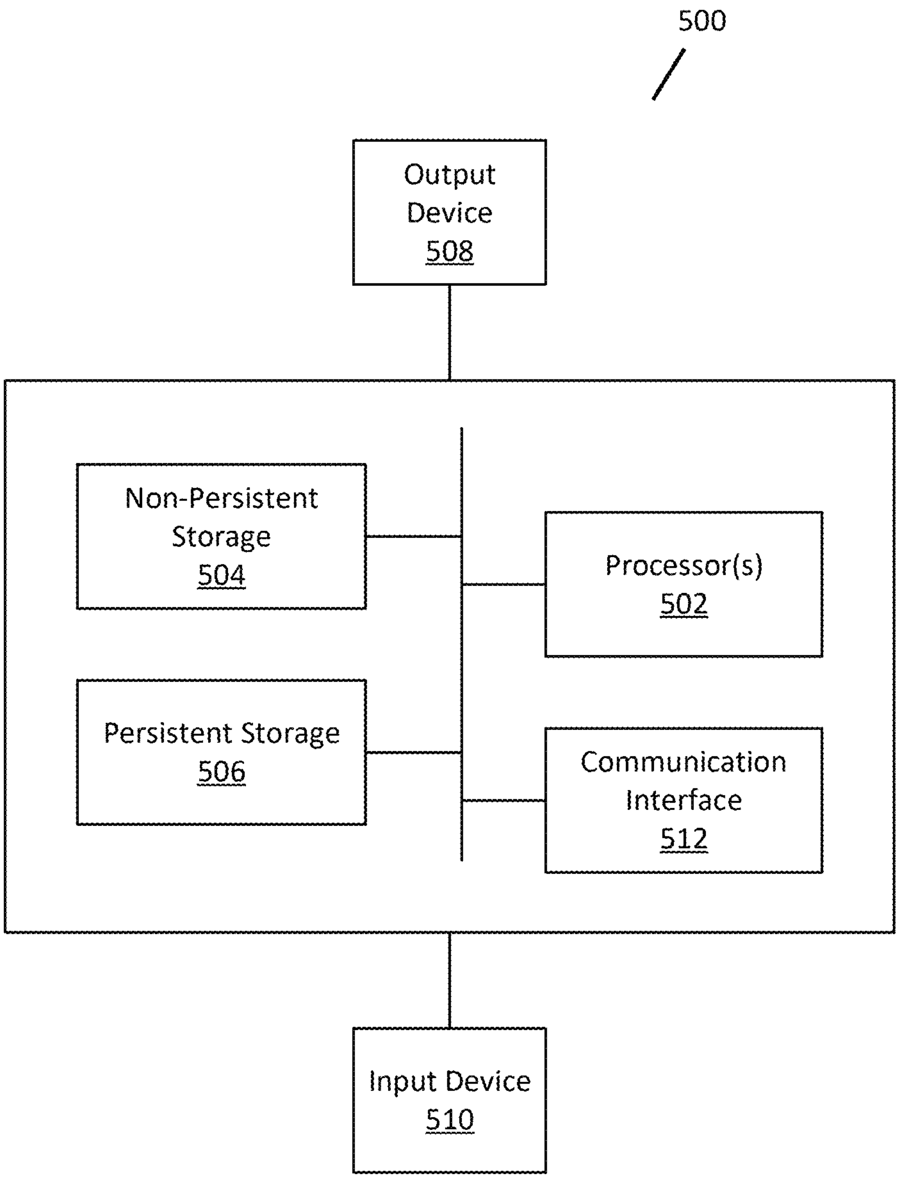
FIG. 5 illustrates a block diagram of a computing device, in accordance with one or more examples disclosed herein.

In one or more examples, the cloud platform 100 is a computing device. In one or more examples, as used herein, a computing device may be any single computing device, a set of computing devices, a portion of one or more computing devices, or any other physical, virtual, and/or logical grouping of computing resources. Non-limiting examples of a computing device are shown in FIG. 4 and FIG. 5, which are described below. In one or more examples, a computing device may be any device of any type that is configured to host all or any portion of one or more operating systems, applications, microservices, clustered environment services, management services, storage services, network services, and/or any other computing function, which may include executing instructions, performing operations, executing functions, performing computations, and the like.

In one or more examples, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components, and/or any combination thereof.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device, a virtual machine, a virtualized computing environment, a logical container (e.g., for one or more applications), a container pod, an Internet of Things (IoT) device, an array of nodes of computing resources, a supercomputing device, a data center or any portion thereof, any combination of the aforementioned items, and/or any other type of computing device. As one of ordinary skill in the art will appreciate, any of the aforementioned examples of computing devices necessarily require at least some hardware components. As an example, a virtual machine, a container, and/or a container pod, when considered herein as a computing device, or a portion of a computing device, includes the underlying hardware on which the virtual machine, container, and/or a container pod executes.

In one or more examples, the storage and/or memory of a computing device or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

Any storage and/or memory of a computing device or system of computing devices may be considered, in whole or in part, as non-transitory computer readable mediums storing software and/or firmware, which, when executed by one or more processors, cause the one or more processors to perform operations (e.g., execution of one or more computer programs) in accordance with one or more examples disclosed herein.

In one or more examples, the cloud platform 100 includes the BMC management platform 102. In one or more examples, the BMC management platform is a computing device (discussed above). In one or more examples, the BMC management platform is configured to interact with and/or provide services for any number of BMCs of any number of computing devices (BMCs are discussed further below). The BMC management platform 102 may be configured to receive information from a BMC, provide information to a BMC, obtain information related to or otherwise relevant to a BMC from any number of information sources, receive queries from a BMC (e.g., queries from a user entered via a user interface of a BMC), provide responses to such queries, and/or perform any number of other services, tasks, and the like for a BMC (e.g., the BMC 124). In one or more examples, the BMC management platform 102 executes as part of the cloud platform 100 to be able to perform functionalities that the BMC may not be capable of performing locally (e.g., due to limited processing resources, memory resources, storage resources, and the like). Although FIG. 1 shows the BMC management platform 102 as executing remote from the BMC 124 as part of the cloud platform 100, in some examples, all or any portion of the components (discussed below) of the BMC management platform may execute on the BMC 124.

In one or more examples, the BMC management platform 102 includes any number of static information parsers 106. In one or more examples, the static information parsers 106 may execute on, or be, one or more computing devices (discussed above) of the BMC management platform 102. In one or more examples, the static information parsers 106 are operatively connected to, and configured to obtain information from, any number of static information sources 104.

In one or more examples, a static information source (e.g., the static information sources 104) is any source of information relevant to a BMC (e.g., the BMC 124) for which the information changes relatively infrequently. Examples of the static information sources 104 include, but are not limited to, user guides (e.g., BMC user guides, BMC user interface user guides, and the like), product documentation, help guides, API guides, and the like. Information from the static information sources 104 may be in any format, with, in some examples, different static information sources providing information in different formats, such as PDF, JSON, hypertext markup language (HTML) and the like.

The static information sources 104 may also include sources of information designed to allow for proper interpretation of other sources of information. As an example, one static information source may be an online resource that provides one or more schemas (e.g., JSON schemas) that allow for interpretation of state information about a computing device that is in a particular format (e.g., JSON). As a more specific example, one static information source may be an online repository of Redfish JSON schemas for interpreting JSON format captures of system state information.

The static information sources 104 may be local or remote storage locations (e.g., storing .pdf versions of user guides, help guides, product documentation, and the like), websites, and/or any other information sources that may be accessed by the static information parsers 106 of the BMC management platform 102. In one or more examples, static information sources may change relatively infrequently, such as when new and/or updated versions of user guides, help guides, API documentation, schemas, and the like are released.

In one or more examples, BMC management platform 102, and, thus, the static information parsers 106 obtain information from at least a portion of the static information sources 104, via a network. As used herein, a network may refer to an entire network or any portion thereof (e.g., a logical portion of the devices within a topology of devices). A network may include a datacenter network, a wide area network, a local area network, a wireless network, a cellular phone network, an InfiniBand network, and/or any other suitable network that facilitates the exchange of information from one part of the network to another (e.g., between devices within and/or connected to the network). A network may be a combination of any of the aforementioned network types. A network may be located at a single physical location or be distributed at any number of physical locations. In one or more examples, a network may be coupled with or overlap with, at least in part, the Internet.

In one or more examples, the static information parsers 106 are configured to obtain information from the static information sources 104 and prepare such information for further processing by the common format document generator 108 (discussed further below). As such, the static information parsers 106 may include any number of parsers, web scrapers, loaders, and the like. As an example, the BMC management platform 102 may include a separate static information parser for parsing each of the different formats of information obtained from the static information sources 104. The static information parsers 106 may be configured to obtain information from the static information sources pursuant to any configured schedule and/or event triggers. As an example, at a time of initial deployment of the BMC management platform 102, the static information parsers 106 may be configured to obtain information from the static information sources 104, and to subsequently re-obtain information from the static information sources 104 upon notification of changes to the static information sources 104 (e.g., when an updated version of documentation is released).

In one or more examples, the BMC management platform 102 includes at least one dynamic information agent 110. In one or more examples, the dynamic information agent 110 is any hardware, or software executing on hardware, that is configured to obtain information from at least one dynamic information source, and to provide or otherwise make information from such dynamic information sources available to the common format document generator 108. As an example, the dynamic information agent 110 may execute on, or be, a computing device (discussed above). As shown in FIG. 1, the dynamic information agent 110 is operatively connected to a system state information server 126 (discussed below) of the BMC 124 (discussed below) of the computing device 122. As such, in one or more examples, the dynamic information agent 110 is configured to obtain current system state information about the computing device 122 from the system state information server 126 of the BMC 124.

The dynamic information agent 110 may be configured to obtain current system state information from the system state information server 126 periodically (e.g., every ten minutes), and/or may be configured to obtain current system state information from the system state information server 126 based on one or more configured triggers. As an example, the dynamic information agent 110 may be configured to obtain current system state information from the system state information server 126 when a particular flag bit is changed to reflect that a change has occurred in the current system state information of the computing device 122.

Although FIG. 1 shows a single dynamic information agent 110 as being operatively connected to only the system state information server 126 as a dynamic information source, the BMC management platform 102 may include any number of dynamic information agents 110, and each dynamic information agent 110 may be operatively connected to and configured to obtain dynamic information from any number of dynamic information sources (not shown), without departing from the scope of examples disclosed herein.

In one or more examples, the static information parsers 106 and the dynamic information agent 110 are operatively connected to the common format document generator 108, and configured to provide information obtained from the static information sources 104 and the dynamic information sources, including current system state information obtained from the system state information server 126, to the common format document generator 108.

In one or more examples, the common format document generator 108 is any hardware, or software executing on hardware, that is configured to process information from static information sources (e.g., the static information sources 104) provided by the static information parsers 106, and information from dynamic information sources (e.g., current system state information from the system state information server 126 provided by the dynamic information agent 110) to generate any number of common format documents. As an example, the LangChain framework may be used as the common format document generator 108 to generate LangChain documents corresponding to each of the static and dynamic information sources.

In one or more examples, the common format document generator 108 stores common format documents generated therefrom in the common format document storage component 112. In one or more examples, the common format document storage component 112 includes a storage medium of any type for storing information, and, in particular, for storing common format documents generated by the common format document generator 108.

In one or more examples, the common format document storage component 112 is operatively connected to the embedding LLM 114. In one or more examples, an embedding LLM is any hardware or software executing on hardware, that is configured to perform embedding based on information included in common format documents stored in the common format document storage component 112. As an example, the embedding LLM 114 may be all or any portion of any number of computing device of the BMC management platform 102. In one or more examples, an embedding is a high dimensional vector representation of text (e.g., words, phrases, entire texts), images, or other data. In one or more examples, the common format documents are processed by the embedding LLM 114 (e.g., OpenAI embedding LLM, a proprietary embedding LLM, and the like) to obtain the vector representations of the data. In one or more examples, such processing includes converting the information in the common format documents into the high dimensional vectors, which may encode the semantic contexts and relationships of the data included within the common format documents. In one or more examples, these vectors are stored in a vector database, and form a corpus of data that may be used, for example, by the inference LLM 118 (discussed below) to provide natural language responses to natural language queries. In one or more examples, the embedding LLM 114 is configured to understand the information in the common format documents generated by the common format document generator, including information in a JSON format, and corresponding JSON schemas. As an example, the embedding LLM may be configured to use one or more schemas from a static information source to properly interpret current system state information received from the system state information server 126 of the BMC 124.

In one or more examples, the embedding LLM 114 stores the high dimensional vectors generated therefrom, representing the data from the common format documents generated by the common format document generator 108, in the vector database 116. In one or more examples, the vector database 116 is a storage medium of any type configured to store high dimensional vectors representing data, and relationships therein, derived from the common format documents stored in the common format document storage component 112 by the embedding LLM 114.

In one or more examples, the BMC management platform 102 includes the inference LLM 118. In one or more examples, the inference LLM 118 is any hardware, or software executing on hardware, that is configured to receive natural language queries (e.g., from the BMC user interface 120, discussed further below), and to process natural language queries (e.g., tokenize the queries) and the high dimensional vectors included in the vector database 116 to generate responses to the queries. As an example, the inference LLM may be all or any portion of a computing device (discussed above) of the BMC management platform 102. In one or more examples, responses to natural language queries that are generated by the inference LLM 118 may be based on the query, context derived from the query, and the information included in the vector database 116 representing the information from both the static information sources 104 and dynamic information sources (e.g., the system state information server 126).

In one or more examples, the system of FIG. 1 includes the computing device 122. In one or more examples, the computing device is an example of a computing device, as discussed above and below in the descriptions of FIG. 4 and/or FIG. 5. In one or more examples, the computing device 122 is any computing device that includes a BMC (e.g., the BMC 124) for managing, at least in part, all or any portion of the various aspects of the computing device 122.

In one or more examples, the computing device 122 includes the BMC 124. In one or more examples, a BMC (e.g., the BMC 124) is a component of a computing device that allows for remote management of various aspects of the computing device 122. As such, the BMC 124 may include, but is not limited to, one or more processors, memory, storage, monitoring components, user interfaces, and the like. The BMC may be configured to monitor the state of the computing device 122 (e.g., temperature, power, fan speed, humidity, communication parameters, installed software, and the like), as well as to perform actions to/for the computing device 122. The BMC 124 may be interacted with using any appropriate technique for accessing the computing device 122, such as, for example, a connection over a network (discussed above), a direct connection to the computing device 122, and the like. The BMC 124 may, for example, be configured to provide access to monitoring, updating, and/or accessing the firmware (e.g., Basic Input/Output System (BIOS)) of the computing device 122, provide a user interface (e.g., the BMC user interface 120) to the BMC 124, generate event logs for events that occur on the computing device 122, monitor various physical aspects of the computing device 122, allow for power-cycling of the computing device, and the like. In one or more examples, the BMC 124 may be considered as an out-of-band management component for the computing device 122.

In one or more examples, the BMC 124 includes the systems state information server 126. In one or more examples, the system state information server 126 is any hardware, or software executing on hardware, that is configured to monitor and obtain the current system state of the computing device 122. In one or more examples, system state information may include any information about the state of the computing device 122. Examples of system state information may include, but are not limited to: storage status (e.g., physical drive status, logical drive status, and the like); temperature of various components of the computing device 122; system fan status; light emitting diode (LED) indicator status; processor status; memory status; power supply status; event log information; configuration information; enabled protocols information; installed software and firmware version information; health status; network component status; redundancy status (e.g., for storage, power supplies, fans, and the like); security status information; power state information; configured policy information; trusted platform module information; access panel status; connection to service provider status; and the like. Other items of information may be considered system state information without departing from the scope of examples included herein.

In one or more examples, the system state information server 126 is operatively connected to the dynamic information agent 110 (discussed above) of the BMC management platform 102. As such, in one or more examples, the dynamic information agent 110 may receive current system state information of the computing device 122 from the system state information server 126. As an example, the system state information server 126 may be a Redfish server executing on the BMC 124 that obtains current system state information of the computing device 122, and provides the system state information to the dynamic information agent 110 in a JSON format. In such an example, at least one of the static information sources 104 may be a repository of Redfish schema, which allows for the interpretation of the JSON format current system state information received by the dynamic information agent 110 from the Redfish server.

In one or more examples, the BMC 124 includes the user interface server 128. In one or more examples, the user interface server is a component executing on the BMC that communicates with the BMC user interface 120. As an example, the user interface server 128 may be a web server. In one or more examples, the BMC user interface 120 is a user interface of any type that is configured to provide a chat-like interface into which a user may enter natural language queries to be transmitted to the BMC (e.g., "List the model number of all installed storage devices"; "what is the current state of the installed memory devices?"; "how do I update my firmware?"; and the like). The BMC user interface may execute on any device that is operatively connected to the BMC. As an example, a user may use a user computing device to navigate to a particular Internet Protocol (IP) address associated with the BMC 124, and be presented with the BMC user interface 120. In one or more examples, interactions of the user with the BMC user interface 120 may be passed to the user interface server 128 of the BMC 124.

In one or more examples, natural language queries received from the BMC user interface 120 at the user interface server 128 may be passed to the BMC management platform interface 130. In one or more examples, the BMC management platform interface 130 executes on the BMC and is configured to interact with the BMC management platform 102. In particular, the BMC management platform interface 130 may be configured to provide natural language queries from the BMC user interface 120 to the inference LLM 118 of the BMC management platform 102. As an example, the BMC management platform interface may include a representational state transfer (REST) client configured to interact with a corresponding API server of the BMC management platform 102. In such an example, the natural language query may be transmitted from the REST client to the API server and, in turn, to the inference LLM 118.

As discussed above, the inference LLM 118 may process a natural language query and information included in the vector database representing information from the static information sources 104 and dynamic information sources such as the system state information server 126 in order to generate natural language responses to the natural language queries. In one or more examples, such natural language responses are provided from the inference LLM to the BMC management platform interface 130. The BMC management platform interface 130 may return the responses to the user interface server 128, and the user interface server 128 may, in turn, provide the responses to the BMC user interface 120, thereby satisfying the queries entered into the BMC user interface by a user.

While FIG. 1 shows a particular configuration of components, other configurations may be used without departing from the scope of examples described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by all or any portion of the components shown in FIG. 1. As another example, although FIG. 1 shows the BMC management platform 102, and the various components therein, as part of the cloud platform 100 and remote from the BMC 124, all or any portion of the components of the BMC management platform 102 may instead be included in the BMC 124 (e.g., the static information parsers 106, the common format document generator 108, the embedding LLM 114, and/or the inference LLM 118 may execute locally on the BMC 124). Accordingly, examples disclosed herein should not be limited to the configuration of components shown in FIG. 1.

Figure 2:
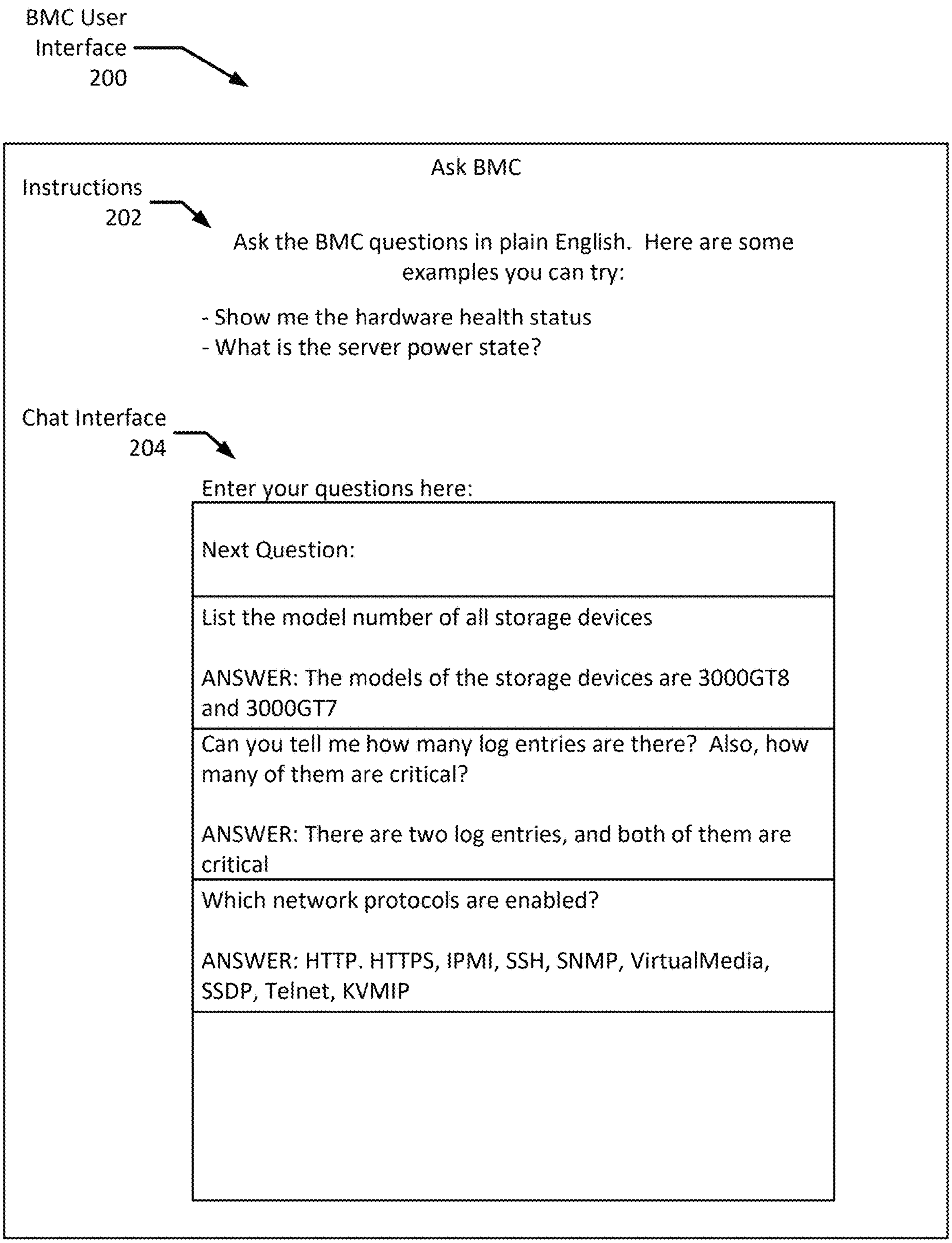
FIG. 2 shows an example of a BMC user interface, in accordance with one or more examples disclosed herein.

FIG. 2 shows an example of a BMC user interface, in accordance with one or more examples disclosed herein. The example shown in FIG. 2 and discussed below is a highly simplified example intended for explanatory purposes only, and not intended to limit the scope of examples disclosed herein. One of ordinary skill in the art, having the benefit of this disclosure, will appreciate that a BMC user interface may include many other features besides a chat interface, may appear differently than what is shown in FIG. 2, and the like.

Referring to FIG. 2, consider a scenario in which a user uses a personal computing device to access the BMC user interface 200 of a BMC (e.g., the BMC 124 of FIG. 1) of a computing device (e.g., the computing device 122 of FIG. 1). As shown in FIG. 2, the BMC user interface includes a portion titled "Ask BMC", which provides a chat interface 204 into which the user may enter natural language queries, and receive responses to the same. The BMC user interface may include instructions 202, which explain that the user may enter questions, and may also include examples of questions that a user may ask.

The chat interface 204 includes a prompt for entering a natural language query. In this field, a user of the BMC user interface 200 may enter a query using plain language. Once the user enters a natural language query, the query may be transmitted, for example, to a web server executing on the BMC (e.g., the BMC 124 of FIG. 1) corresponding to the BMC user interface 200. The web server may provide the natural language query to a BMC management platform interface (e.g., the BMC management platform interface 130 of FIG. 1). The BMC management platform interface may, in turn, communicate the natural language query to a BMC management platform (e.g., the BMC management platform 102 of FIG. 1), where the query is ultimately provided to an inference LLM (e.g., the inference LLM 118 of FIG. 1).

The inference LLM then processes the query (e.g., tokenizes the query) and, using the high dimensional vectors in a vector database (e.g., the vector database 116 of FIG. 1) of the BMC management platform, generates a natural language response to the natural language query. The response may be communicated back to the BMC (e.g., by way of the BMC management platform interface), from which the response may be communicated back to the BMC user interface (e.g., by way of a web server of the BMC).

Chat interface 204 shows a series of natural language queries entered by a user in the manner discussed above, along with the corresponding responses received to the queries.

Figure 3:
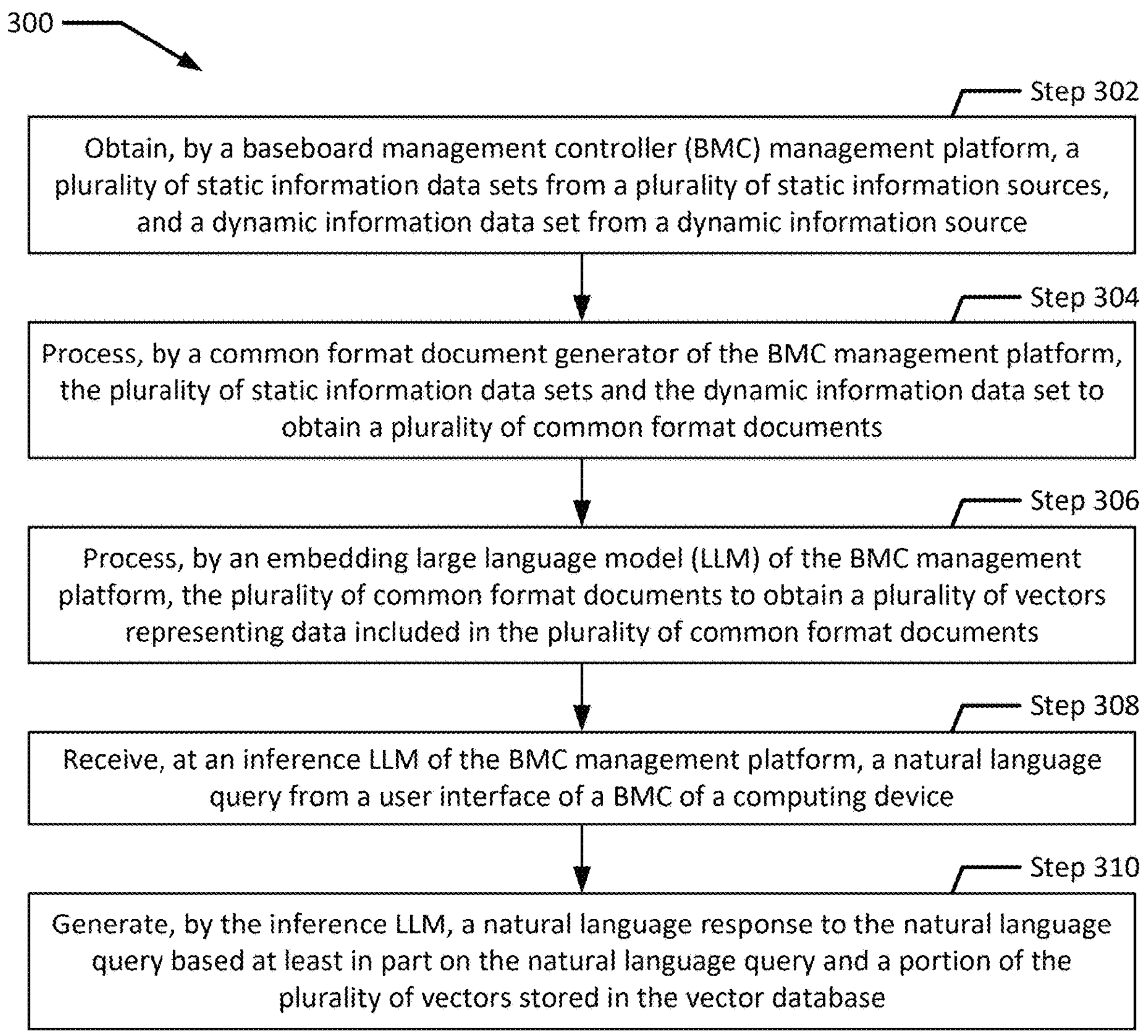
FIG. 3 illustrates an overview of an example method for implementing a generative artificial intelligence-based interface to BMCs, in accordance with one or more examples disclosed herein.

FIG. 3 illustrates an overview of an example method 300 for using a generative artificial intelligence-based interface to a BMC, in accordance with one or more examples disclosed herein.

The method 300 may be performed, at least in part, by one or more devices and/or components of the system shown in FIG. 1 and/or FIG. 2. As such, all or any portion of the method 300 may be performed, for example, by a BMC management platform (e.g., the BMC management platform 102 of FIG. 1), static information parsers (e.g., the static information parsers 106 of FIG. 1), a common format document generator (e.g., the common format document generator 108 of FIG. 1), a dynamic information agent (e.g., the dynamic information agent 110 of FIG. 1), an embedding LLM (e.g., the embedding LLM 114 of FIG. 1), an inference LLM (e.g., the inference LLM 118 of FIG. 1), a BMC (e.g., the BMC 124 of FIG. 1), a system state information server (e.g., the system state information server 126 of FIG. 1), a BMC management platform interface (e.g., the BMC management platform interface 130 of FIG. 1), a user interface server (e.g., the user interface server 128 of FIG. 1), and/or a BMC user interface (e.g., the BMC user interface 120 of FIG. 1; the BMC user interface 200 of FIG. 2)

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3 and/or steps not shown in FIG. 3.

In Step 302, the method 300 includes obtaining, by a BMC management platform (e.g., the BMC management platform 102 of FIG. 1), a plurality of static information data sets from a plurality of static information sources (e.g., the static information sources 104 of FIG. 1), and a dynamic information data set from a dynamic information source (e.g., the system state information server 126 of FIG. 1).

In one or more examples, the BMC management platform includes any number of static information parsers (e.g., the static information parsers 106 of FIG. 1) configured to obtain, parse, load, and the like information from any number of static information sources. Information from the static information sources may be in any of a variety of formats (e.g., pdf, HTML, JSON schema, and the like).

The static information sources may be obtained, for example, from storage locations, repositories, websites, and the like. As an example, the static information sources may be accesses by the BMC management platform over a network. The static information may include, but are not limited to, BMC user guides, user interface user guides, API user guides, product documentation, schemas, and the like. In one or more examples, at least one of the static information sources includes one or more schemas to be used in interpreting information obtained from a dynamic information source. For example, one static information source may be a repository of JSON schemas, which may be used by an embedding LLM when interpreting information obtained about the current system state of a computing device from a system state information server of a BMC of the computing device. In one or more examples, information from static information sources may be obtained once, and then re-obtained at certain pre-defined times, such as, for example, when a new version of documentation, a user guide, and/or a schema is released.

In one or more examples, the dynamic information source is any source of information from which the information obtained frequently changes. As an example, the dynamic information source may be a system state information server of a BMC of a computing device, from which current system state information of a computing device may be obtained. Information from a dynamic information source may be obtained, for example, by a dynamic information agent of the BMC management platform. Information from a dynamic information source may be obtained at pre-configured times, such as periodically (e.g., every minute, every ten minutes, and the like), and/or based on a pre-configured trigger, such as a change to the current state information of a computing device (e.g., as indicated to a flag bit maintained on the BMC that changes when system state information changes). In one or more examples, the static information data sets obtained from the static information sources and the dynamic information data set obtained from the dynamic information source may be made available to a common format document generator (e.g., the common format document generator 108 of FIG. 1) of the BMC management platform.

In Step 304, the method 300 includes processing, by a common format document generator of the BMC management platform, the plurality of static information data sets and the dynamic information data set to obtain a plurality of common format documents. As an example, the common format document generator may be a LangChain framework, which may process the plurality of static information data sets and the dynamic information data set to obtain corresponding LangChain documents. Other frameworks for generating common format documents may be used without departing from the scope of examples disclosed herein. In one or more examples, the common format documents are stored in a common format document storage device of the BMC management platform.

In Step 306, the method 300 includes processing, by an embedding LLM of the BMC management platform, the plurality of common format documents to obtain a plurality of vectors representing data included in the plurality of common format documents. In one or more examples, such processing includes converting the information in the common format documents into high dimensional vectors, which may encode the semantic contexts and relationships of data within the common format documents. In one or more examples, these vectors are stored in a vector database, and form a corpus of data that may be used, for example, by an inference LLM to provide natural language responses to natural language queries from a BMC user interface.

In Step 308, the method 300 includes receiving, at an inference LLM of the BMC management platform, a natural language query from a user interface of a BMC of a computing device. In one or more examples, a BMC is configured with a natural language query user interface accessible from a user device. As an example, the natural language user interface may include a chat interface, into which a user may enter (e.g., type, speak-to-text, and the like) natural language queries for the BMC. In one or more examples, the natural language query entered by a user in the BMC natural language query user interface may be received at the BMC, and then provided to the inference LLM.

In Step 310, the method 300 includes generating, by the inference LLM, a natural language response to the natural language query based at least in part on the natural language query and a portion of the plurality of vectors stored in the vector database. The response may be based on the query, context derived from the query, and the information included in the vector database representing the information from the static and/or dynamic information sources. In one or more examples, the natural language response generated by the inference LLM may be provided to the BMC, and, in turn, to the BMC user interface from which the natural language query was received, which may display the response for the user.

FIG. 4 illustrates a block diagram of a computing device 400, in accordance with one or more examples disclosed herein. The computing device 400 may be an example of all or any portion of the components shown in FIG. 1 (e.g., the cloud platform 100, the BMC management platform 102, the static information parsers 106, the dynamic information agent 110, the common format document generator 108, the embedding LLM 114, the inference LLM 118, the computing device 122, the BMC 124, the system state information server 126, the user interface server 128, the BMC management platform interface 130, the BMC user interface 120) and described above, and/or of the computing device 500, described below. As discussed above in the descriptions of FIG. 1, FIG. 2, and FIG. 3, the computing device 400 may be used to implement all or any portion of the various components shown in FIG. 1 and described above and/or to perform all or any portion of the method 300 shown in FIG. 3 and described above.

The computing device 400 may include one or more processors 402 and memory 404. The memory 404 may include a non-transitory computer-readable medium that stores programming for execution by one or more of the one or more processors 402. In this implementation, one or more modules within the computing device 400 may be partially or wholly embodied, at least in part, as software for performing any functionality described in this disclosure. The computing device 400 may be, for example, configured to perform the method 300 shown in FIG. 3 and described above, by executing instructions included in the memory 404 and executed by the one or more processors 402.

For example, the memory 404 may include instructions 406 to obtain, by a baseboard management controller (BMC) management platform, a plurality of static information data sets from a plurality of static information sources, and a dynamic information data set from a dynamic information source (e.g., as described above in reference to Step 302 of FIG. 3).

For example, the memory 404 may include instructions 408 to process, by a common format document generator of the BMC management platform, the plurality of static information data sets and the dynamic information data set to obtain a plurality of common format documents (e.g., as described above in reference to Step 304 of FIG. 3).

For example, the memory 404 may include instructions 410 to process, by an embedding large language model (LLM) of the BMC management platform, the plurality of common format documents to obtain a plurality of vectors representing data included in the plurality of common format documents (e.g., as described above in reference to Step 306 of FIG. 3).

For example, the memory 404 may include instructions 412 to receive, at an inference LLM of the BMC management platform, a natural language query from a user interface of a BMC of a computing device (e.g., as described above in reference to Step 308 of FIG. 3).

For example, the memory 404 may include instructions 414 to generate, by the inference LLM, a natural language response to the natural language query based at least in part on the natural language query and a portion of the plurality of vectors stored in the vector database (e.g., as described above in reference to Step 310 of FIG. 3).

FIG. 5 illustrates a block diagram of a computing device 500, in accordance with one or more examples of this disclosure. As discussed above, examples described herein may be implemented, at least in part, using computing devices, and the computing device 500 shown in FIG. 5 may be such a computing device. For example, all or any portion of the components shown in FIG. 1 (e.g., the cloud platform 100, the BMC management platform 102, the static information parsers 106, the dynamic information agent 110, the common format document generator 108, the embedding LLM 114, the inference LLM 118, the computing device 122, the BMC 124, the system state information server 126, the user interface server 128, the BMC management platform interface 130, the BMC user interface 120) may be implemented, at least in part using a computing device such as the computing device 500, and may include all or any portion of the components of the computing device 500 shown in FIG. 5 and described below.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. In some examples, a computing device (e.g., the computing device 500) may include any number of homogeneous or heterogeneous processors of any type.

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be a central processing unit (CPU), a multi-core CPU, an application specific integrated circuit (ASIC), a graphics processing unit (GPU), a data processing unit (DPU), a tensor processing units (TPU), an associative processing unit (APU), a vision processing units (VPU), a quantum processing unit (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart or flow diagram may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, a network device, or a processing device (e.g., one or more processors) to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and the like.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operative connection, and variations thereof, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

obtain, by a baseboard management controller (BMC) management platform, a plurality of static information data sets from a plurality of static information sources, and a dynamic information data set from a dynamic information source;

process, by a common format document generator of the BMC management platform, the plurality of static information data sets and the dynamic information data set to obtain a plurality of common format documents;

process, by an embedding large language model (LLM), the plurality of common format documents to obtain a plurality of vectors representing data included in the plurality of common format documents;

receive, at an inference LLM, a natural language query from a user interface of a BMC of a computing device; and generate, by the inference LLM, a natural language response to the natural language query based at least in part on the natural language query and a portion of the plurality of vectors.

2. The system of claim 1, wherein a static information source of the plurality of static information sources provides information related to interpreting the dynamic information data set from the dynamic information source.

3. The system of claim 1, wherein the plurality of static information sources comprise at least one of a BMC user guide, application programming interface (API) documentation, and a schema.

4. The system of claim 1, wherein the dynamic information data set comprises current system state of the computing device comprising the BMC.

5. The system of claim 1, wherein:

the BMC management platform comprises the common format document generator, the embedding LLM, and the inference LLM, and the BMC management platform is remote from the computing device that comprises the BMC.

6. The system of claim 5, wherein:

the dynamic information source is a system state information server executing on the BMC, and to obtain the dynamic information data set from the dynamic information source, a dynamic information agent of the BMC management platform obtains the dynamic information data set from the system state information server at configured times or in response to an occurrence of one or more events.

7. The system of claim 1, wherein the BMC management platform, the common format document generator, the embedding LLM, and the inference LLM execute on the BMC.

8. The system of claim 1, wherein the plurality of vectors encode semantic contexts and data relationships derived from the plurality of common format documents by the embedding LLM.

9. The system of claim 1, wherein the natural language response is provided to the user interface of the BMC for display to a user.

10. A computer-implemented method, comprising:

obtaining, by a baseboard management controller (BMC) management platform, a plurality of static information data sets from a plurality of static information sources, and a dynamic information data set from a dynamic information source;

processing, by a common format document generator of the BMC management platform, the plurality of static information data sets and the dynamic information data set to obtain a plurality of common format documents;

processing, by an embedding large language model (LLM), the plurality of common format documents to obtain a plurality of vectors representing data included in the plurality of common format documents;

receiving, at an inference LLM, a natural language query from a user interface of a BMC of a computing device; and generating, by the inference LLM, a natural language response to the natural language query based at least in part on the natural language query and a portion of the plurality of vectors.

11. The computer-implemented method of claim 10, wherein a static information source of the plurality of static information sources provides information related to interpreting the dynamic information data set from the dynamic information source.

12. The computer-implemented method of claim 10, wherein the plurality of static information sources comprise at least one of a BMC user guide, application programming interface (API) documentation, and a schema.

13. The computer-implemented method of claim 10, wherein the dynamic information data set comprises current system state of the computing device comprising the BMC.

14. The computer-implemented method of claim 10, wherein:

the BMC management platform comprises the common format document generator, the embedding LLM, and the inference LLM, and the BMC management platform is remote from the computing device that comprises the BMC.

15. The computer-implemented method of claim 14, wherein:

the dynamic information source is a system state information server executing on the BMC, and to obtain the dynamic information data set from the dynamic information source, a dynamic information agent of the BMC management platform obtains the dynamic information data set from the system state information server at configured times or in response to an occurrence of one or more events.

16. The computer-implemented method of claim 10, wherein the BMC management platform, the common format document generator, the embedding LLM, and the inference LLM execute on the BMC.

17. The computer-implemented method of claim 10, wherein the plurality of vectors encode semantic contexts and data relationships derived from the plurality of common format documents.

18. The computer-implemented method of claim 10, wherein the natural language response is provided to the user interface of the BMC for display to a user.

* * * * *